(12) United States Patent
Kim et al.

(10) Patent No.: US 9,998,495 B2
(45) Date of Patent: Jun. 12, 2018

(54) APPARATUS AND METHOD FOR VERIFYING DETECTION RULE

(71) Applicant: Electronics and Telecommunications Research Institute, Daejeon (KR)

(72) Inventors: Sung-Ho Kim, Daejeon (KR); Sung-Il Lee, Daejeon (KR); Su-Chul Lee, Daejeon (KR); Han-Jun Yoon, Daejeon (KR); Do-Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 205 days.

(21) Appl. No.: 15/066,208

(22) Filed: Mar. 10, 2016

(65) Prior Publication Data

US 2017/0149831 A1    May 25, 2017

(30) Foreign Application Priority Data

Nov. 24, 2015 (KR) .................. 10-2015-0164487

(51) Int. Cl.
*H04L 29/06* (2006.01)
*G06N 7/00* (2006.01)
(52) U.S. Cl.
CPC ............ *H04L 63/20* (2013.01); *G06N 7/005* (2013.01); *H04L 63/1416* (2013.01)
(58) Field of Classification Search
CPC ..... G06N 7/005; H04L 63/20; H04L 63/1416; G06F 17/271; G06F 17/274
See application file for complete search history.

(56) References Cited

U.S. PATENT DOCUMENTS

| 9,154,583 B2 * | 10/2015 | Brown ................ H04L 47/20 |
| 9,398,040 B2 | 7/2016 | Lee et al. |
| 2004/0196839 A1 * | 10/2004 | Sahita ............... H04L 41/0893 370/389 |
| 2009/0192787 A1 * | 7/2009 | Roon ................. G06F 17/2715 704/9 |
| 2009/0240644 A1 * | 9/2009 | Boettcher ............ H04L 41/142 706/47 |

(Continued)

FOREIGN PATENT DOCUMENTS

| KR | 10-0628329 B1 | 9/2006 |
| KR | 10-2013-0094370 A | 8/2013 |

(Continued)

OTHER PUBLICATIONS

Sung-Ho K. et al., "An automated Signature Pattern Extraction Method Using Topic Modeling," Communications of the Korean Institute of Information Scientists and Engineers, vol. 33(6):61-65 (2015).

*Primary Examiner* — Amir Mehrmanesh
(74) *Attorney, Agent, or Firm* — Nelson Mullins Riley & Scarborough LLP; Anthony A. Laurentano

(57) ABSTRACT

Disclosed herein are an apparatus and method for verifying a detection rule. The apparatus for verifying a detection rule includes a grammar checking unit for checking for a grammatical error in a loaded detection rule, a false-positive rate calculation unit for calculating a false-positive rate of the loaded detection rule by applying a latent Dirichlet allocation algorithm to a signature used in the detection rule, and a similarity checking unit for checking similarity between the detection rule and an existing pre-stored detection rule.

12 Claims, 4 Drawing Sheets

(56) References Cited

U.S. PATENT DOCUMENTS

| | | |
|---|---|---|
| 2011/0295982 A1 | 12/2011 | Misra |
| 2014/0196103 A1 | 7/2014 | Chari et al. |
| 2014/0241155 A1 | 8/2014 | Cha |
| 2014/0359692 A1 | 12/2014 | Chari et al. |
| 2015/0113646 A1 | 4/2015 | Lee et al. |
| 2015/0127325 A1* | 5/2015 | Birnbaum ............ G06F 17/271 704/9 |

FOREIGN PATENT DOCUMENTS

| | | |
|---|---|---|
| KR | 10-1436874 B1 | 9/2014 |
| KR | 10-1448550 B1 | 10/2014 |
| KR | 10-1488271 B1 | 2/2015 |

\* cited by examiner

APPARATUS AND METHOD FOR VERIFYING DETECTION RULE

CROSS REFERENCE TO RELATED APPLICATION

This application claims the benefit of Korean Patent Application No. 10-2015-0164487, filed Nov. 24, 2015, which is hereby incorporated by reference in its entirety into this application.

BACKGROUND OF THE INVENTION

1. Technical Field

The present invention generally relates to technology for verifying network traffic detection rules used in a network security system and, more particularly, to technology for verifying detection rules required to detect network traffic using a signature included in detection rules.

2. Description of the Related Art

Companies that provide various types of services over the Internet have introduced and operated various types of network security equipment so as to protect service networks from internally and externally originating malicious traffic. Network security equipment such as intrusion detection systems, intrusion prevention systems, and integrated security equipment chiefly uses signature-based pattern matching detection rules to determine whether traffic is malicious.

Network traffic detection rules may be generated and verified only when there is professional knowledge about networks, security, and an operating system (OS). Further, the generation and verification of network traffic detection rules depend directly on the performance and reliability of network security equipment, and thus it is very important to generate network traffic detection rules and verify the generated detection rules.

When incorrect network traffic detection rules are generated, network security equipment must perform unnecessary operations, and thus the performance of the network security equipment is deteriorated.

Further, incorrect network traffic detection rules entail a high risk of generating false positive rates, thus decreasing the reliability of network security equipment and potentially incapacitating the network in which network security equipment is installed.

Therefore, the verification of network traffic detection rules is very important to network security. Further, at the present time, detection rules are generated such that a security expert or a network expert personally collects and analyzes malicious traffic and individually generates and verifies detection rules. However, there are limitations in that there are very few experts who can verify detection rules and in that it takes a lot of time to verify detection rules.

Therefore, there is an urgent need to develop technology for verifying network traffic detection rules, which allow even semi-skilled workers to rapidly and accurately verify the detection rules.

PRIOR ART DOCUMENTS

Patent Documents (Patent Document 1) Korean Patent No. 10-1436874 (Date of Publication: Aug. 27, 2014, entitled "Apparatus and Method for Improving Detection Performance of Intrusion Detection System")

SUMMARY OF THE INVENTION

Accordingly, the present invention has been made keeping in mind the above problems occurring in the prior art, and an object of the present invention is to improve the reliability of network security equipment by verifying previously generated detection rules and receiving corrected detection rules when the detection rules are inefficient or unreliable.

Another object of the present invention is to provide, in advance, notification of the possibility that unnecessary operations for detection rules will be performed and operations causing overload will be processed, and to receive corrected detection rules, thus enabling detection rules to be accurately and efficiently generated.

A further object of the present invention is to allow even semi-skilled experts to easily verify detection rules, thus enabling prompt responses to network threats, which are rapidly becoming more numerous.

Yet another object of the present invention is to reduce the time and expense required to verify network traffic detection rules.

In accordance with an aspect of the present invention to accomplish the above objects, there is provided an apparatus for verifying a detection rule, including a grammar checking unit for checking for a grammatical error in a loaded detection rule, a false-positive rate calculation unit for calculating a false-positive rate of the loaded detection rule by applying a latent Dirichlet allocation algorithm to a signature used in the detection rule, and a similarity checking unit for checking similarity between the detection rule and an existing pre-stored detection rule.

The false-positive calculation unit may extract the signature used in the detection rule, and calculates a false-positive rate of the detection rule that uses the signature by applying the latent Dirichlet allocation algorithm both to the signature and to pre-stored normal traffic.

The apparatus may further include an overload prediction unit for predicting a possibility of an overload occurring in the detection rule verification apparatus.

The overload prediction unit may predict a possibility of an unnecessary operation being performed in the detection rule verification apparatus or the possibility of the overload occurring in the detection rule verification apparatus using at least one of IP address information applied to the detection rule, port information applied to the detection rule, and a result of checking for the grammatical error.

The overload prediction unit may be configured to, if the possibility of the overload occurring is predicted, request an external verification server to perform an operation on behalf of the detection rule verification apparatus.

The similarity checking unit may provide a user with information about at least one of a detection rule similar to the loaded detection rule, a similar portion between the loaded detection rule and the existing pre-stored detection rule, and the similarity therebetween.

The apparatus may further include a detection rule editing unit for receiving a corrected detection rule if the similarity is equal to or greater than a similarity threshold.

The grammar checking unit may be configured to, when the grammatical error exists, output error existence details including at least one of a position of the grammatical error and content of the grammatical error.

The apparatus may further include a detection rule editing unit for, when the grammatical error exists, receiving a corrected detection rule.

In accordance with another aspect of the present invention to accomplish the above objects, there is provided a method for verifying a detection rule, the method being performed by a detection rule verification apparatus, including checking for a grammatical error in a loaded detection rule, calculating a false-positive rate of the detection rule by applying a latent Dirichlet allocation algorithm to a signature used in the loaded detection rule, and checking similarity between the detection rule and an existing pre-stored detection rule.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
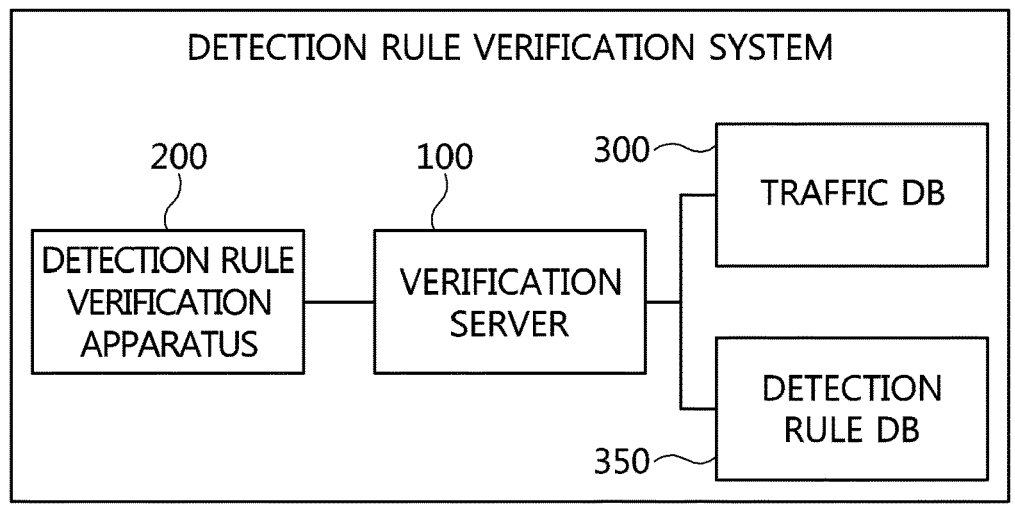
FIG. 1 is a diagram showing a detection rule verification system according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

FIG. 1 is a diagram showing a detection rule verification system according to an embodiment of the present invention.

As shown in FIG. 1, a detection rule verification apparatus 200 may be implemented to be included in a detection rule verification system. The detection rule verification system includes a verification server 100, the detection rule verification apparatus 200, a traffic database (DB) 300, and a detection rule DB 350.

First, the verification server 100 receives a request from the detection rule verification apparatus 200, and executes a task for authenticating the user of the detection rule verification apparatus 200 and performing an operation having high complexity on behalf of the detection rule verification apparatus 200.

Here, the detection rule verification system may be implemented such that, when the verification server 100 is not provided, the detection rule verification apparatus 200 performs all operations required to verify and manage detection rules.

The detection rule verification apparatus 200 analyzes each generated detection rule and notifies the user in advance of information about whether unnecessary operations will be performed and about whether an operation expected to cause an overload will be processed.

Further, the detection rule verification apparatus 200 extracts a signature used in the detection rule, and calculates the false-positive rate of the detection rule that uses the corresponding signature by applying a latent Dirichlet allocation algorithm both to the extracted signature and to normal traffic.

In addition, the detection rule verification apparatus 200 checks whether grammatical errors exist in a loaded detection rule, determines whether the false-positive rate of the detection rule is less than a false-positive rate threshold, and compares the similarity between the loaded detection rule and an existing pre-stored detection rule with a similarity threshold. As a result of the comparison, if it is determined that the correction and editing of the detection rule are required, the detection rule verification apparatus 200 notifies the user of this requirement, and receives a corrected detection rule corresponding to the detection rule from the user.

Next, the traffic DB 300 stores and manages normal traffic and malicious traffic for individual users or groups.

Finally, the detection rule DB 350 stores and manages detection rules for respective users or groups, as well as detection rules that are currently active.

Although, for the convenience of description, the detection rule verification apparatus 200 has been described as being implemented in the state of being included in the detection rule verification system, the present invention is not limited thereto, and it is also possible for the detection rule verification apparatus 200 to independently verify and manage detection rules.

Figure 2:
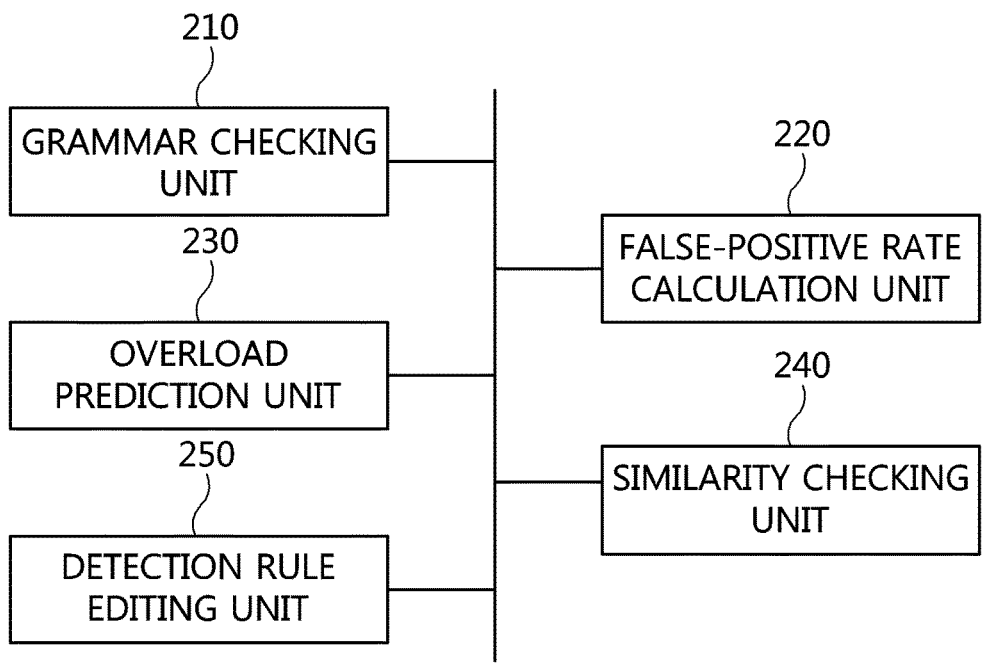
FIG. 2 is a block diagram showing the configuration of a detection rule verification apparatus according to an embodiment of the present invention.

FIG. 2 is a block diagram showing the configuration of the detection rule verification apparatus according to an embodiment of the present invention.

As shown in FIG. 2, the detection rule verification apparatus 200 includes a grammar checking unit 210, a false-positive rate calculation unit 220, an overload prediction unit 230, a similarity checking unit 240, and a detection rule editing unit 250.

First, the grammar checking unit 210 checks for a grammatical error in a loaded detection rule.

Subsequently, if the grammatical error exists, the grammar checking unit 210 may output error existence details including at least one of the position of the grammatical error and the content of the grammatical error.

The false-positive rate calculation unit 220 extracts a signature used in the detection rule, and calculates the false-positive rate of the detection rule that uses the corresponding signature by applying a latent Dirichlet allocation algorithm to the extracted signature and to normal traffic.

Further, the overload prediction unit 230 predicts the possibility of an overload occurring in the detection rule verification apparatus 200. Here, the overload prediction unit 230 may predict the probability that the detection rule verification apparatus 200 will perform an unnecessary operation or that an overload will occur in the apparatus 200, using at least one of Internet Protocol (IP) address information applied to the detection rule, port information applied to the detection rule, and the result of checking for a grammatical error.

When there is the possibility of an overload occurring, the overload prediction unit 230 may request an external verification server to perform an operation on behalf of the detection rule verification apparatus 200.

Next, the similarity checking unit 240 checks the similarity between the loaded detection rule and each existing pre-stored detection rule.

Further, the similarity checking unit 240 may provide the user with information about at least one of a pre-stored detection rule similar to the loaded detection rule, a portion similar to that of the loaded detection rule, and the corresponding similarity.

Finally, when a grammatical error exists, the detection rule editing unit 250 notifies the user of the existence of the grammatical error and receives an error-corrected detection rule from the user.

Furthermore, when the similarity is equal to or greater than the similarity threshold, the detection rule editing unit 250 notifies the user that the similarity of the loaded detection rule is equal to or greater than the similarity threshold, and receives a corrected detection rule from the user.

Hereinafter, the detection rule verification method performed by the detection rule verification apparatus according to an embodiment of the present invention will be described in detail with reference to FIG. 3.

Figure 3:
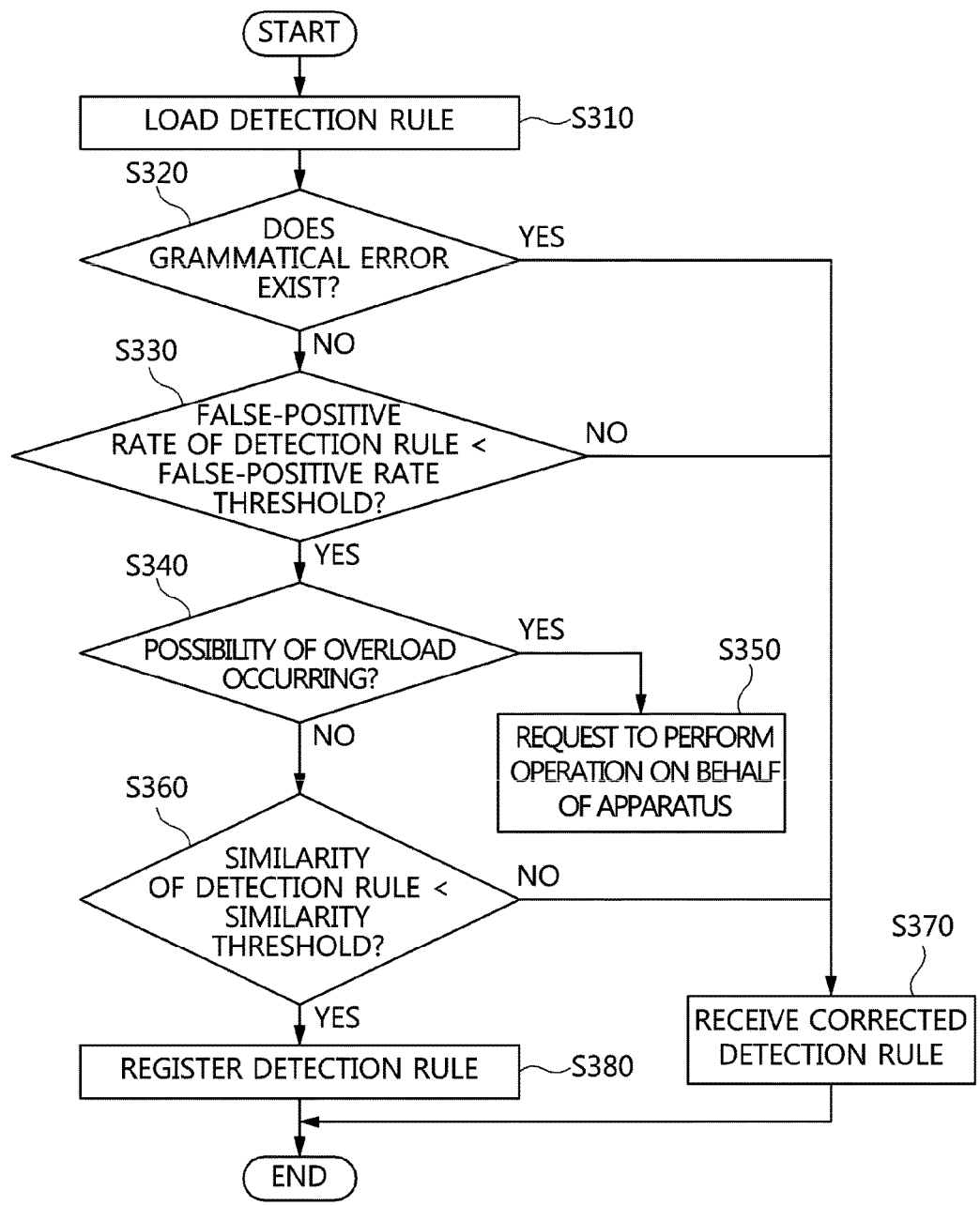
FIG. 3 is a flowchart showing a detection rule verification method performed by the detection rule verification apparatus according to an embodiment of the present invention.

FIG. 3 is a flowchart showing a detection rule verification method performed by the detection rule verification apparatus according to an embodiment of the present invention.

First, the detection rule verification apparatus 200 loads a detection rule to be verified at step S310.

Here, the detection rule to be verified may be either externally input or selected by the user from among detection rules pre-stored in the detection rule DB.

Further, the detection rule verification apparatus 200 determines whether a grammatical error exists in the loaded detection rule at S320.

As a result of the determination, if a grammatical error exists in the detection rule, the detection rule verification apparatus 200 may output information about the grammatical error and may provide the information to the user.

Further, if the grammatical error exists in the detection rule, the detection rule verification apparatus 200 may receive an error-corrected detection rule, required to correct the grammatical error, from the user by performing step S370, which will be described later.

Next, the detection rule verification apparatus 200 calculates a false-positive rate of the detection rule and determines whether the calculated false-positive rate is less than a false-positive rate threshold at step S330.

The detection rule verification apparatus 200 extracts a signature used in the loaded detection rule. Further, the detection rule verification apparatus 200 applies a latent Dirichlet allocation (LDA) algorithm to pre-stored normal traffic and to the extracted signature. The latent Dirichlet allocation algorithm is a probability model pertaining to the themes that are present in a malicious traffic file, which is a given document.

In this way, the detection rule verification apparatus 200 may cluster network traffic containing malicious traffic by applying the latent Dirichlet allocation algorithm to the network traffic at step S330, extract a signature using information about the distribution of keywords for respective clusters of classified network traffic, and calculate a false-positive rate of the corresponding detection rule using the extracted signature.

Further, the detection rule verification apparatus 200 determines whether the loaded detection rule entails the possibility that an overload will occur at step S340.

The detection rule verification apparatus 200 determines whether an unnecessary operation may be performed, and conducts a guide check to determine whether there is the possibility of an overload occurring.

If it is determined that the loaded detection rule entails the possibility of an overload occurring, the detection rule verification apparatus 200 requests an external verification server to perform an operation on behalf of the apparatus 200 at step S350.

Further, the detection rule verification apparatus 200 may receive the results of the operation, which has been performed on behalf of the apparatus 200, from the external verification sever, and may verify the detection rule using the received results.

Further, if there is the possibility of an overload occurring, the detection rule verification apparatus 200 performs the step S370 of receiving a corrected detection rule from the user.

In contrast, if there is no possibility that an overload will occur, the detection rule verification apparatus 200 calculates the similarity between the loaded detection rule and each pre-stored detection rule and determines whether the similarity is less than a similarity threshold at step S360.

Subsequently, if it is determined that the calculated similarity is equal to or greater than the similarity threshold, the detection rule verification apparatus 200 receives a corrected detection rule from the user at step S370.

In contrast, if the calculated similarity is less than the similarity threshold, the detection rule verification apparatus 200 registers the corresponding detection rule in detection rule storage at step S380.

The detection rule verification apparatus 200 may store and manage detection rules, verification of which has been completed and which have been newly registered, and detection rules, which have been previously generated and stored, for respective users or groups. Here, the detection rules may be stored and managed for respective users or groups in the detection rule DB.

For the convenience of description, the detection rule verification apparatus 200 has been described as verifying each of the loaded detection rules in the sequence of determining whether a grammatical error exists in the loaded detection rule, comparing the false-positive rate of the detection rule with the false-positive rate threshold, determining whether the detection rule entails the possibility of an overload occurring, and comparing the similarity of the detection rule with the similarity threshold.

However, the verification of the present invention is not limited to this sequence, but the detection rule verification apparatus 200 may be applied after the design scheme thereof has been changed so that the sequence of the steps of determining whether a grammatical error exists in the loaded detection rule, comparing the false-positive rate of the detection rule with the false-positive rate threshold, determining whether the detection rule entails the possibility of an overload occurring, and comparing the similarity of the detection rule with the similarity threshold is adjusted to fit the situation.

Figure 4:
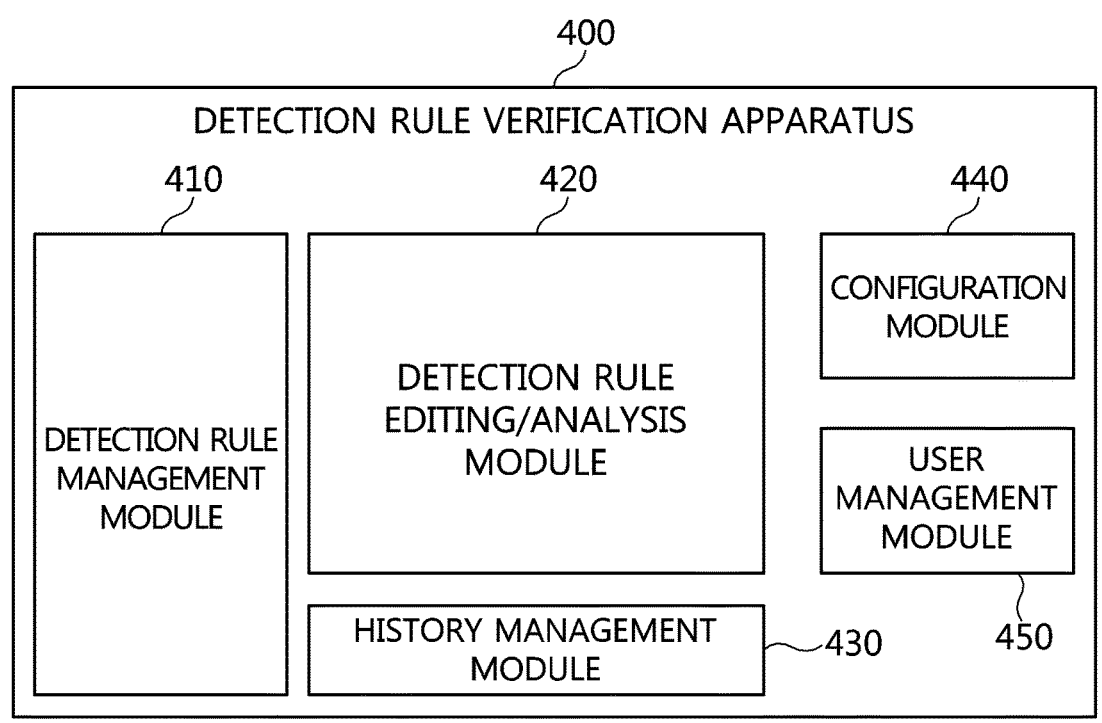
FIG. 4 is a diagram showing the configuration of a detection rule verification apparatus according to another embodiment of the present invention.

FIG. 4 is a diagram showing the configuration of a detection rule verification apparatus according to another embodiment of the present invention.

As shown in FIG. 4, a detection rule verification apparatus 400 includes a detection rule management module 410, a detection rule editing/analysis module 420, a history management module 430, a configuration module 440, and a user management module 450.

First, the detection rule management module 410 manages detection rules which are currently generated for respective users, or detection rules which have been previously distributed and used, loads the detection rule to be verified, and prepares to verify the detection rule.

Further, the detection rule editing/analysis module 420 analyzes and edits the loaded detection rule.

Figure 5:
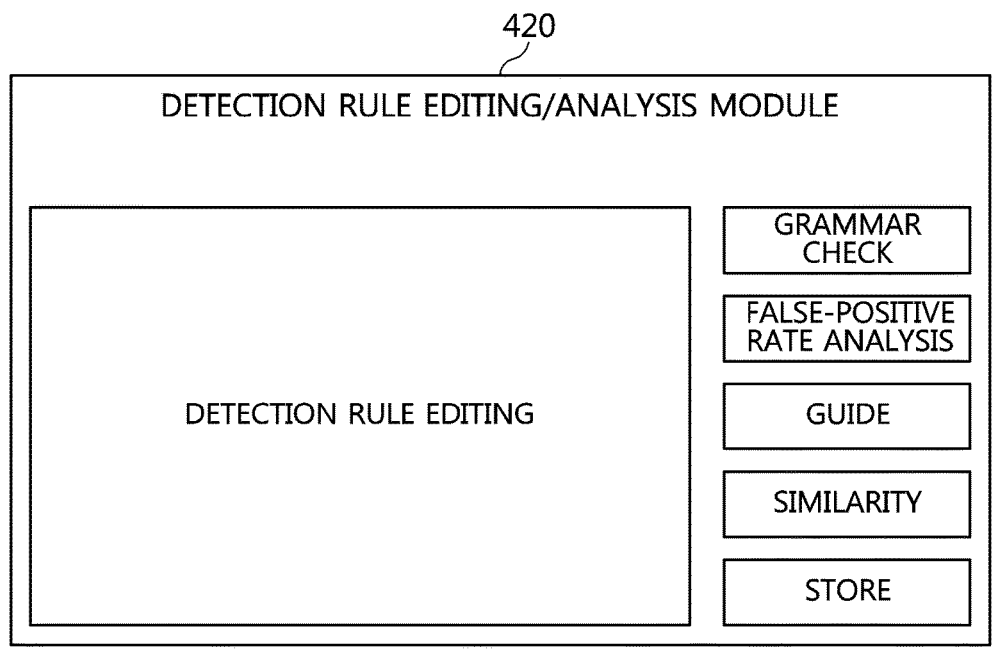
FIG. 5 is a diagram illustrating the functions of a detection rule editing/analysis module according to an embodiment of the present invention.

FIG. 5 is a diagram showing the functions of the detection rule editing/analysis module according to an embodiment of the present invention.

As shown in FIG. 5, the detection rule editing/analysis module 420 may perform a detection rule editing function, a grammar check function, a false-positive rate analysis function, a guide function, a similarity determination function, and a storage function.

Here, the detection rule editing function may be implemented by outputting a loaded detection rule, providing it to the user, and receiving an edited detection rule from the user.

Further, the detection rule editing/analysis module 420 performs a function, such as grammar checking, false-positive rate analysis, guide execution, or similarity checking, in order to verify the loaded detection rule. Grammar checking is configured to check whether a grammatical error exists in the loaded detection rule.

If the grammatical error exists, the detection rule editing/analysis module 420 may output and provide the content of the grammatical error to the user, and may receive an edited detection rule from the user.

On the other hand, when there is no grammatical error, the detection rule editing/analysis module 420 calculates the false-positive rate of the loaded detection rule. In order to calculate the false-positive rate, the detection rule editing/analysis module 420 extracts a signature used in the loaded detection rule and extracts a signature from pre-stored normal traffic. Further, the false-positive rate, occurring when the extracted signature is used, is calculated using the latent Dirichlet allocation algorithm.

The detection rule editing/analysis module 420 may output the calculated false-positive rate and provide it to the user, and may receive a corrected signature corresponding to the signature used in the detection rule from the user.

Further, the detection rule editing/analysis module 420 performs a guide check for checking whether an unnecessary operation will be performed in the detection rule verification apparatus 400, or determining whether there is the possibility of an overload occurring in the detection rule verification apparatus 400. The detection rule editing/analysis module 420 may provide the result of the guide check to the user, or may receive an edited detection rule from the user based on the result of the guide check.

Furthermore, the detection rule editing/analysis module 420 may analyze the similarity between the loaded detection rule and each existing pre-stored detection rule or each detection rule previously applied to the detection rule verification apparatus 400, and may store the result of analysis of the similarity therebetween.

Referring back to FIG. 4, the history management module 430 stores the histories of tasks performed by the detection rule verification apparatus 400, and the user may search the history management module 430 for task histories for respective users or respective detection rules.

Further, the configuration module 440 may store parameter values, server addresses, etc. required to apply the latent Dirichlet allocation algorithm, and may receive parameter values, server addresses, etc. set by the user.

Finally, the user management module 450 manages the user who performs the detection rule verification task. The user management module 450 may be used to add a new user or delete or change an existing user. Also, the user management module 450 may be used to modify privileges and other information for each user and may manage multiple users by organizing them in groups.

In accordance with the present invention, the reliability of network security equipment may be improved by verifying previously generated detection rules and receiving corrected detection rules when the detection rules are inefficient or unreliable.

Further, in accordance with the present invention, notification of the possibility that unnecessary operations for detection rules will be performed and that operations causing overload will be processed may be provided in advance, and corrected detection rules may be received, thus enabling detection rules to be accurately and efficiently generated.

Furthermore, in accordance with the present invention, even semi-skilled experts may easily verify detection rules, thus enabling prompt responses to network threats, which are rapidly becoming more numerous.

Furthermore, in accordance with the present invention, the time and expense required to verify network traffic detection rules may be reduced.

As described above, in the detection rule verification apparatus and method according to the present invention, the configurations and schemes in the above-described embodiments are not limitedly applied, and some or all of the above embodiments can be selectively combined and configured so that various modifications are possible.

What is claimed is:

1. An apparatus for verifying a detection rule, comprising a processor that is configured to include:
    a grammar checking unit for checking for a grammatical error in a loaded detection rule;
    a false-positive rate calculation unit for calculating a false-positive rate of the loaded detection rule by applying a latent Dirichlet allocation algorithm to a signature used in the detection rule;
    a similarity checking unit for checking similarity between the detection rule and an existing pre-stored detection rule; and
    an overload prediction unit for predicting a possibility of an overload occurring in the detection rule verification apparatus,
    wherein the overload prediction unit predicts a possibility of an unnecessary operation being performed in the detection rule verification apparatus or the possibility of the overload occurring in the detection rule verification apparatus using at least one of IP address information applied to the detection rule, port information applied to the detection rule, and a result of checking for the grammatical error, and
    wherein the overload prediction unit is configured to, if the possibility of the overload occurring is predicted, request an external verification server to perform an operation on behalf of the detection rule verification apparatus.

2. The apparatus of claim 1, wherein the false-positive calculation unit extracts the signature used in the detection rule, and calculates a false-positive rate of the detection rule that uses the signature by applying the latent Dirichlet allocation algorithm both to the signature and to pre-stored normal traffic.

3. The apparatus of claim 1, wherein the similarity checking unit provides a user with information about at least one of a detection rule similar to the loaded detection rule, a similar portion between the loaded detection rule and the existing pre-stored detection rule, and the similarity therebetween.

4. The apparatus of claim 3, further comprising a detection rule editing unit for receiving a corrected detection rule if the similarity is equal to or greater than a similarity threshold.

5. The apparatus of claim 1, wherein the grammar checking unit is configured to, when the grammatical error exists, output error existence details including at least one of a position of the grammatical error and content of the grammatical error.

6. The apparatus of claim 5, further comprising a detection rule editing unit for, when the grammatical error exists, receiving a corrected detection rule.

7. A method for verifying a detection rule, the method being performed by a detection rule verification apparatus, comprising:
  checking for a grammatical error in a loaded detection rule;
  calculating a false-positive rate of the detection rule by applying a latent Dirichlet allocation algorithm to a signature used in the loaded detection rule;
  checking similarity between the detection rule and an existing pre-stored detection rule; and
  predicting a possibility of an overload occurring in the detection rule verification apparatus by predicting a possibility of an unnecessary operation being performed in the detection rule verification apparatus or the possibility of the overload occurring in the detection rule verification apparatus using at least one of IP address information applied to the detection rule, port information applied to the detection rule, and a result of checking for the grammatical error,
  wherein if the possibility of the overload occurring is predicted, requesting an external verification server to perform an operation on behalf of the detection rule verification apparatus.

8. The method of claim 7, wherein calculating the false-positive rate of the detection rule comprises:
  extracting the signature used in the detection rule; and
  calculating a false-positive rate of the detection rule that uses the signature by applying the latent Dirichlet allocation algorithm both to the signature and to pre-stored normal traffic.

9. The method of claim 7, wherein checking the similarity between the detection rule and an existing pre-stored detection rule is configured to provide a user with information about at least one of a detection rule similar to the loaded detection rule, a similar portion between the loaded detection rule and the existing pre-stored detection rule, and the similarity therebetween.

10. The method of claim 9, further comprising:
  receiving a corrected detection rule if the similarity is equal to or greater than a similarity threshold.

11. The method of claim 7, wherein checking for the grammatical error in the loaded detection rule is configured to, when the grammatical error exists, output error existence details including at least one of a position of the grammatical error and content of the grammatical error.

12. The method of claim 11, further comprising receiving a corrected detection rule when the grammatical error exists.

* * * * *